Feb. 20, 1945.  C. W. CURLE ET AL  2,369,947
TYPE SLUG END CUTTER
Filed Oct. 31, 1941  7 Sheets-Sheet 5

INVENTORS
CHARLES W. CURLE
THEODORE C. CURLE
RAY F. NEWTON
BY Castberg & Roemer
ATTORNEYS.

Feb. 20, 1945.  C. W. CURLE ET AL  2,369,947
TYPE SLUG END CUTTER
Filed Oct. 31, 1941  7 Sheets-Sheet 6

INVENTORS
CHARLES W. CURLE
THEODORE C. CURLE
RAY F. NEWTON
BY

ATTORNEYS.

Feb. 20, 1945.  C. W. CURLE ET AL  2,369,947
TYPE SLUG END CUTTER
Filed Oct. 31, 1941  7 Sheets-Sheet 7

INVENTORS
CHARLES W. CURLE
THEODORE C. CURLE
RAY F. NEWTON
BY
Castberg & Roemer
ATTORNEYS.

Patented Feb. 20, 1945

2,369,947

UNITED STATES PATENT OFFICE 2,369,947

TYPE SLUG END CUTTER

Charles W. Curle, San Francisco, Theodore C. Curle, Ross, and Ray F. Newton, San Francisco, Calif.

Application October 31, 1941, Serial No. 417,348

6 Claims. (Cl. 29—70)

The present invention relates to the trimming of type slugs as they issue from a line casting machine, and particularly to a machine for cutting off the ends of the slugs to make them square and parallel with each other, and to produce slugs of equal length.

The machine of the present invention is designed for operation in conjunction with a side trimmer and a low slugger of the types disclosed in our co-pending applications, entitled "Type slug side trimmer," filed October 31, 1941, Serial Number 417,346, and "Type slug low slugger," filed October 31, 1941, Serial Number 417,347. It is adapted, however, for use with any slug trimming mechanism, or may, if desired, be used independently of such mechanisms.

It is the object of the invention to provide an end cutter for type slugs embodying improved mechanism for gripping a slug presented to it, for drawing the slug into engagement with spaced cutter members, and thereafter for stacking the cut slug in a galley or the like.

A further object is the provision of means for adjusting both cutter members, one in steps to accommodate slugs of different lengths, and the other in small increments to produce an overall length for the finished slug of any desired measurement.

A further object is the provision of a machine of the character described which will receive in rapid succession and automatically cut slugs to exact length, then discharge the cut slugs with a minimum possibility of interruption due to clogging or jamming by the residual portions of the slugs.

Further objects and advantages of the invention are made apparent in the following specification, wherein reference is made to the accompanying drawings, in which one form of the invention is illustrated in detail.

Figure 1:
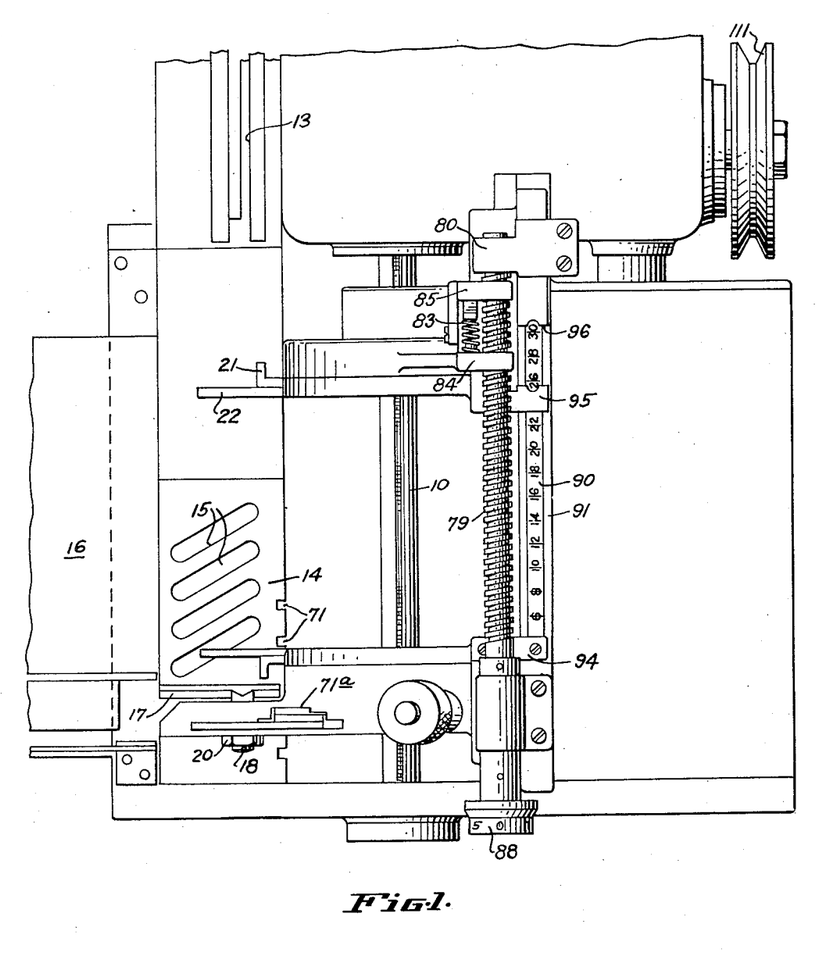
Fig. 1 is a plan view of the major portion of a machine embodying the present invention.
Figure 2:
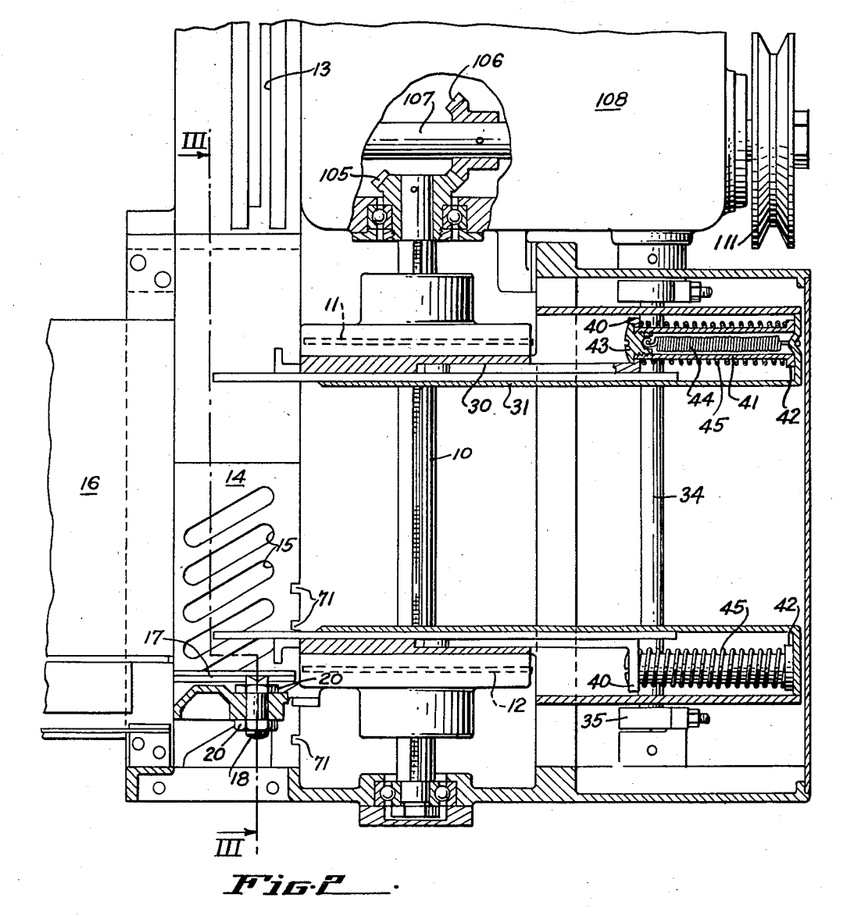
Fig. 2 is a similar view, with parts removed and parts in section, to illustrate certain features of construction.
Figure 6:
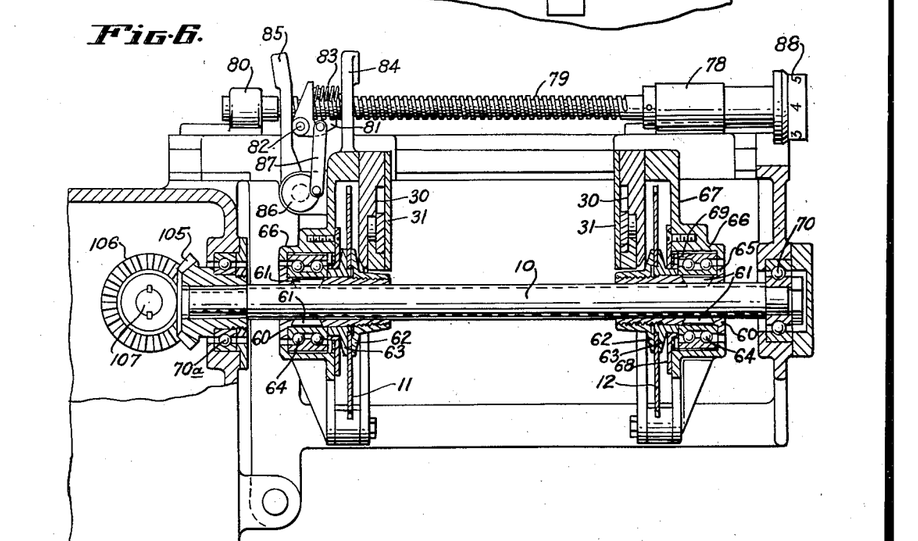
Fig. 6 is a sectional view taken along line VI—VI of Fig. 5.

Referring to Figs. 1, 2 and 6, the end cutter of the present invention is shown as comprising a shaft 10 which supports and drives a pair of spaced circular saws 11 and 12. The particular manner in which the saws are mounted and adjusted will be set forth in detail hereinafter. They may for the present be considered as rotating continuously and as spaced apart a predetermined distance so that a slug presented to them from a position parallel to the shaft 10 will be trimmed at both its ends.

A slug, issuing from a line casting machine, and usually having been previously subjected to side trimming and low slugging operations, descends by gravity or, preferably, by suitable slug advancing mechanism of the kind disclosed in our co-pending application entitled "Type slug side trimmer;" Serial No. 417,346, filed October 31, 1941, through a chute 13 (see Figs. 1 and 2) and comes to rest on a table 14 which is slotted as at 15 to permit the escape of chips formed as residue of the sawing operation.

Figure 3:
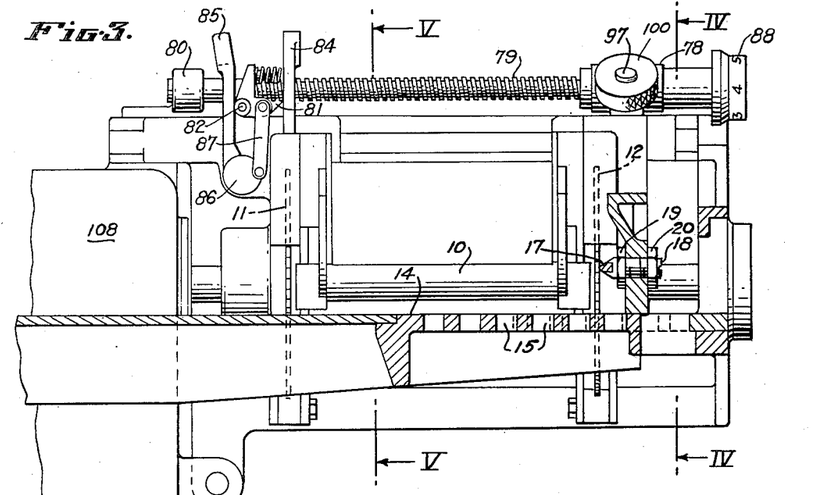
Fig. 3 is a sectional view taken along line III—III of Fig. 2.

The saws 11 and 12 are disposed to the right of the table 14 and to its left is a galley 16 upon which the slugs are stacked, after their ends are cut, in the order in which they issue from the line casting machine. As each slug is received by the table 14, it is brought to rest directly in front of the saws by engagement with a stop bar 17. This stop bar is formed as shown in Fig. 3, with a sharpened forward edge which cuts into the type metal of which the slug is formed, upon impact of the slug against it, in order to limit any tendency of the slug to rebound due to the impact. The stop bar 17 is mounted on a threaded stud 18 which may be adjusted and fixed in position by a pair of lock nuts 19 and 20.

Figure 5:
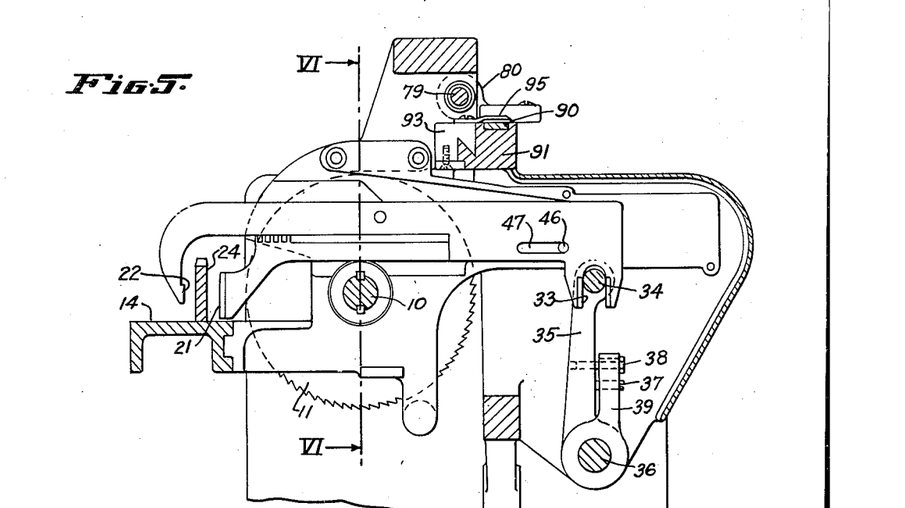
Fig. 5 is a sectional view taken along line V—V of Fig. 3.
Figure 7:
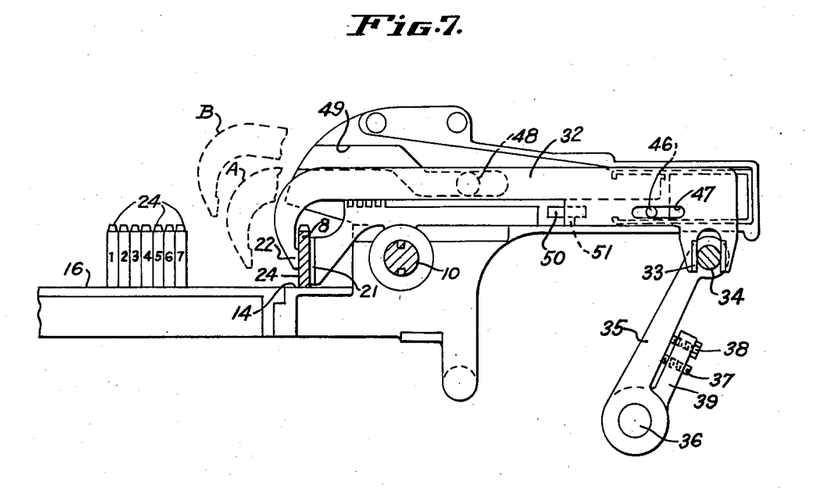
Fig. 7 is a view like Fig. 5, but illustrating only parts pertinent to the operation of the gripping jaws shown in Fig. 5.

Immediately after the slug comes to rest in front of the saws, it is gripped between two sets of clamping jaws, each set of which comprises a lower jaw 21 and an upper jaw 22. These clamping jaws first draw the slug toward the rotating circular saws which sever its ends to produce a slug of exact length predetermined by the spacing of the saws, then push it back over the table 14, release it, and deposit it on the galley 16. This sequence of operations is clearly illustrated in Figs. 5, 7 and 8 of the drawings. In Fig. 5, the jaws 21 and 22 are shown in their normal positions, with a slug 24 resting between them in the position it will occupy when it has come to rest on the table 14. Referring now to Fig. 7, the jaws are shown as having moved inwardly, the upper jaw 22 moving first to clamp the slug against the lower jaw 21 and then both jaws moving until the slug has been acted upon by the saws. The jaws then move outwardly or away from the saws, the lower jaw 21 serving to push the slug across the table 14 and onto the galley 16. During this advancing movement of the jaws the upper jaw swings up through the positions indicated in dotted lines at A and B, so that the slug is released at the end of the outward movement and the jaws return to their normal position, shown in Fig. 5, to receive the next slug to be cut. In Fig. 7 the slugs 24 are numbered from 1 to 8, to indicate the order in which they issued from the line casting machine and to illustrate the fact that they are stacked in the galley in the same order. Upon movement of the slug 8 from the position shown on to the galley, the stack of slugs 1 to 7 will be pushed to the left the width of one slug and each succeeding slug is correspondingly added to the right hand end of the stack.

The mechanism for supporting and operating the clamping jaws 21 and 22 to cause them to function in the manner just described is illustrated in Figs. 7 to 10. Each set of jaws is slidably mounted in a guide 30 (see also Fig. 6) and covered by a cover plate 31. These guides are supported one by each of the saw guards which are adjustable with the saws, as will presently appear, so that the jaws always occupy the same position relative to the saws. As the sets of jaws are identical in structure and operation, one set only will be described.

The upper jaw 22 (Fig. 10) is carried on an arm 32, the inner end of which is formed to provide a fork 33 which embraces a bar 34 supported between the upper ends of a pair of levers 35. The levers 35 are mounted on a shaft 36 and adjusted and fixed relative thereto by means of an adjusting screw 37 and a set screw 38, both carried by an arm 39 which is pinned against rotation on the shaft 36. The shaft 36 receives an oscillating movement, through drive means presently to be described, to advance and retract the upper jaw. The lower jaw 21 carries a fork 40 disposed at right angles to its inner end, and, as shown in Fig. 2, this fork embraces a double acting spring assembly which permits the lower jaw to move either in or out against spring tension. This double acting spring assembly includes a tube 41 with a flange 42 at its inner end and a plug 43 threaded in its outer end. The fork 40 embraces the tube behind the enlarged head of the plug 43. A contractile spring 44 extending between the plug 43 and the inner end of the jaw guide 30 therefore imposes a tension on the lower jaw which resists its outward movement. An expansible spring 45 surrounds the tube 41 and is interposed between the flange 42 thereof and the fork 40 of the lower jaw, resiliently resisting inward movement of the jaw. Upon outward movement of the jaw the tube moves with it, carrying the spring 45 in its normal position.

The jaws 21 and 22 are interconnected by a pin 46 on the lower jaw, which projects into an elongated slot 47 on the upper jaw. Consequently the upper jaw moves inwardly independently of the lower jaw, from the normal position shown in Fig. 5 until the slug is gripped. Further inward movement is imparted through the slug to the lower jaw which compresses the spring 45 to load it for returning the lower jaw to normal. Upon outward movement of the upper jaw the end of its slot 47 engages the pin 46 as the jaws pass their normal positions and the lower jaw is moved outwardly against the tension of the spring 44, which later returns it to normal. To raise the upper jaw as it approaches its fully extended position, it carries a roller 48 which rides in a cam track 49 formed in the housing 30, and including an upwardly inclined portion intermediate its ends to swing the jaw upwardly about the center of the pin 46 by which it is connected to the lower jaw.

Figure 8:
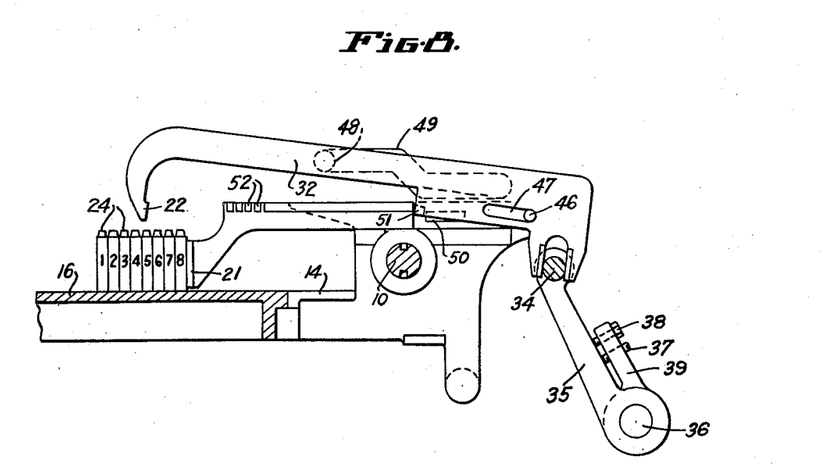
Fig. 8 is a view like Fig. 7, illustrating the gripping jaws in their fully extended position.
Figures 9, 10:
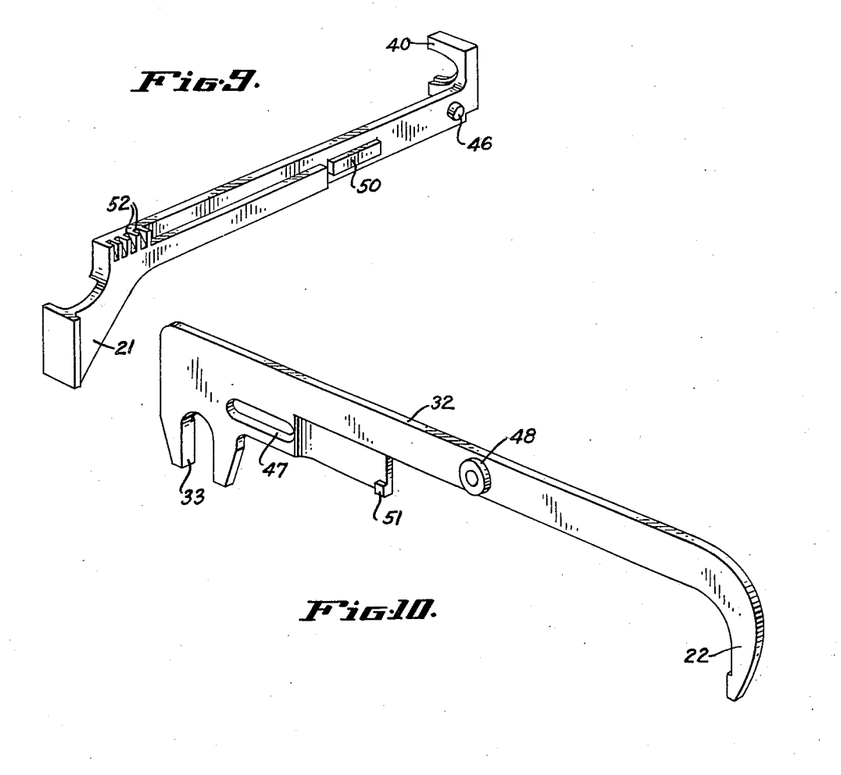
Fig. 9 is a perspective view of the lower of the two gripping jaws illustrated in Figs. 7 and 8.
Fig. 10 is a perspective view of the upper of the two gripping jaws.

It is essential that the lower jaw return from its extended position to normal after each operation, as failure of either of the lower jaws to do so would cause it to obstruct the next slug descending onto the table 14 and prevent its being properly received and cut. As the return spring of the lower jaw is liable to fail or its return movement be hindered by chips or otherwise, a positive acting emergency return is provided. This emergency return includes an elongated lug 50 projecting from one side of the lower jaw and a co-acting lug 51 on the upper jaw. Lug 51 normally underlies lug 50 (see Fig. 7), but moves forwardly and upwardly as the jaws are extended to occupy a position in front of the lug 50, as shown in Fig. 8. Upon return of the jaws the lug 51 will engage the lug 50 and positively return the lower jaw if its spring fails, or it becomes jammed or stuck. As the jaws reach normal, the lug 51 assumes its position below the lug 50, so as not to prevent independent retraction of the upper jaw. Where the upper jaw slides over the forward upper edge of the lower jaw, this edge is notched, as shown at 52 in Fig. 9, to prevent the accumulation of chips from the cutting operation.

The length of the slug after it has been cut depends upon the spacing between the saws 11 and 12, so these saws are made adjustable, one to accommodate slugs cast in different sizes, and the other to determine the exact length of the finished slug. The saws are therefore both mounted for adjustment longitudinally of the shaft 10 by which they are rotated. The saw mountings are identical and each, as shown in Fig. 6, comprises a hollow mandrel 60 which is slidable on the shaft 10 and keyed thereto by keys 61 which extend into longitudinal splines in the shaft. There are preferably two such keys 61 in each mandrel diametrically opposed for balance. The saw blade is held on the mandrel by a nut 62 which clamps the blade against a collar 63. This collar is backed by the inner race of a ball bearing 64 which in turn backs against a flange 65 on the mandrel.

The outer race of the bearing 64 is inclosed by a housing 66 which is formed as an integral part of a guard casting 67 which covers and protects the saw blade. An annular plate 68 is secured by screws to the inside of the guard casting 67 and an annular marcelled spring 69, interposed between this plate and the outer race of the bearing 64, retains the bearing against endwise movement in its housing. The outer race of the bearing fits loosely within its housing, so that while the saws are accurately aligned by being mounted on the same shaft, the castings which guard them need not be supported with the same degree of accuracy, but may be moved radially for the distance of the space between the bearings 64 and the housing 66. Through this construction the saws may be adjusted longitudinally of the shaft 10 by moving the guard castings 67. The bearings 64 are designed to prevent thrust play during this adjustment and during operation of the saws, though the saws are actually supported for rotation by bearings 70 and 70a which mount the opposite ends of the shaft 10.

The saw 12 may be latched in several positions of adjustment, determined by spaced notches 71 (see Figs. 1 and 2) formed in the edge of the table 14. A sliding bolt 71a, shown in Figs. 1 and 4, enters any one of these notches. The bolt 71a is carried by the saw guard casting 67 so as to prevent longitudinal movement of the casting relative to the shaft 10 when the bolt is engaged in one of the notches. The bolt 71a is provided with shoulder screws 72 which extend through slots 73 to permit it to slide vertically and a link 74 connects the bolt with a lever 75 pivoted to the casting as at 76, so that it may be manually manipulated to retract the bolt when the saw is to be adjusted, and to advance the bolt into a notch for latching it in its adjusted position.

The adjustment of the saw just described is to set the machine to receive slugs of a given length, usually measured in increments of inches. The exact length to which the slug is to be trimmed by the operation of the saw is adjustable by movement of the other saw through the mechanism now to be described.

As shown in Figs. 1, 5 and 6, the guard of the saw 12 supports a bearing 78 for one end of a threaded shaft 79, the other end of which is journalled in a bearing 80 supported by the framework of the machine independently of the saw 11. The guard of the saw 11 is latched to the threaded shaft 79 by a latch 81 which has teeth registering with the threads on the shaft and which is pivoted relative to the guard at 82. A spring 83 is interposed between the tail of the latch and a handle 84 which extends upwardly from the saw guard normally to hold the latch engaged. A latch releasing lever 85 is pivoted at 86 and is connected by a link 87 with the latch 81, so that the handle 84 and lever 85 may be grasped simultaneously to withdraw the latch and to move the saw longitudinally of the shaft 10 while the latch is free of the threads on the shaft 79. This permits adjustment of the saw 11 in increments equal to the pitch of the threads on the shaft 79. To effect finer adjustments the shaft may be rotated by a graduated hand dial 88 secured to its end, thus gradually advancing or retracting the point of engagement between its threads and the notched latch 81.

Figure 4:
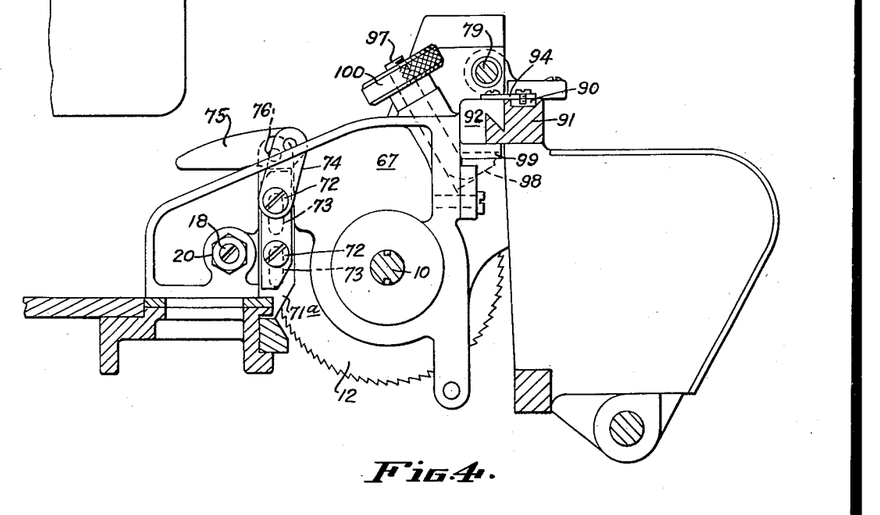
Fig. 4 is a sectional view taken along line IV—IV of Fig. 3.

The distance between the saws 11 and 12 is measured on a scale 90, shown in Figs. 1, 4 and 5, as slidable longitudinally on a rail 91 which is a rigid part of the frame of the machine. The saw 12 is guided along the rail 91 by a sliding connection between the rail and a block 92, shown in Fig. 4 as carried by the saw guard assembly. A similar block 93 (Fig. 5) guides the saw 11 along the rail 91. The block 92 carries a plate 94 screwed to the scale 90 so that adjustment of the saw 12 causes the scale to slide longitudinally of the rail 91. The block 93 carries a plate 95 which overlies the scale to form a reference line for determining the distance between the saws. When the lower saw 12 is adjusted, the upper end of the scale slides under a fixed reference line 96, which indicates the position to which it has been adjusted, and therefore indicates the length of slug the machine is set to receive. This movement of the scale when the saw 12 is adjusted also accommodates it to the saw 11, so that a true reading of the distance between saws may be taken directly from the position of the reference plate 95 at all times. The guard assembly of the saw 12 is preferably clamped in any position to which it has been adjusted by means of a bolt 97 (Fig. 4) which has a foot 98 at its lower end adapted to be drawn upwardly to cause a plate 99 to press against the under side of the rail 91, thus drawing the block 92 into firm engagement therewith. A knurled nut 100 is threaded to the bolt to draw it upwardly, and is of course loosened when the saw is to be adjusted along the rail.

Figure 11:
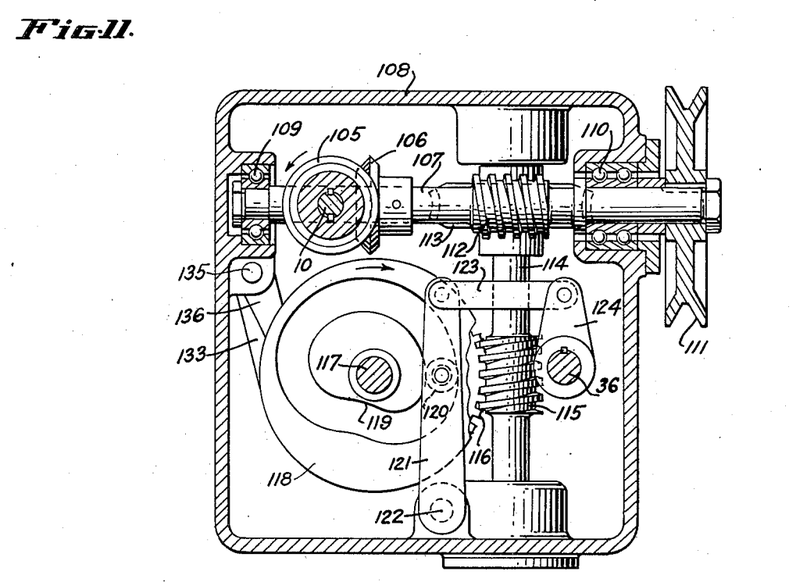
Fig. 11 is a section taken through the power transmission housing, illustrating the drive mechanism.

The shaft 10 which rotates the saws 11 and 12 is continuously driven through a bevel gear 105 secured to its end, as shown in Fig. 2, and meshes with a similar gear 106 pinned to a shaft 107 which extends through a transmission housing 108 (see also Fig. 11). The shaft 107 is journalled in bearings 109 and 110 and has an end extending through the housing to be driven by some suitable power source, such as an electric motor with which it may be connected as by a pulley 111 and a belt not shown.

The power for operating the gripping jaws which feed the slugs to the saws and stack them in the galley may also be taken from the shaft 107. As shown in Fig. 11, this shaft carries a worm 112 which drives a worm gear 113 on a shaft 114. The shaft 114 also carries a worm 115 which meshes with a gear 116 rotating on a countershaft 117; also mounted on the countershaft 117 is a cam 118 which is normally at rest but adapted to be clutched to the gear 116 for rotation therewith for a single cycle when the gripping jaws are to be operated. The cam 118 has a cam groove 119 on its side, which receives a roller 120 carried by an arm 121. This arm is pivoted to swing from a center 122 and has its upper end connected by a link 123 with a crank arm 124 keyed to shaft 36 which, recalling Figs. 5, 7 and 8, is the shaft which carries the arms 35 which operate the gripping jaws. Thus each complete rotation of the cam 118 effects a complete cycle of operation of the gripping jaws heretofore described.

Figure 12:
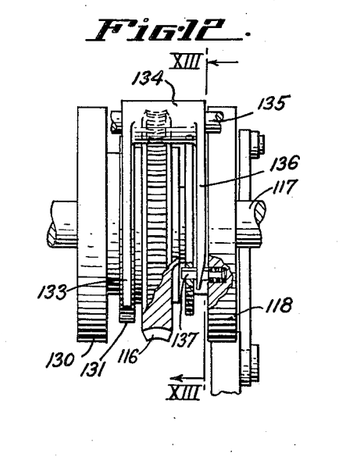
Fig. 12 is a detail view illustrating in end elevation the gripper operating cam shown in Fig. 11, and also illustrating the means by which it is clutched for single cycle operation to the constantly moving drive mechanism.
Figure 13:
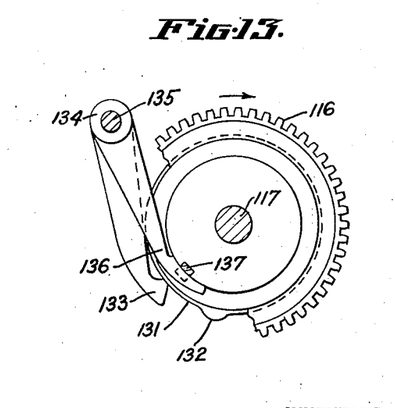
Fig. 13 is a section taken along line XIII—XIII of Fig. 12, with parts broken away.

The cam 118 should be rotated once for each slug which is fed to the end cutting saws, and it is desirable therefore that the approaching slug trip some mechanism to cause engagement of a single cycle clutch to drive the cam with the gear 116 each time a slug is presented to the saws. Any suitable clutch and trip mechanism may be employed, and a preferred mechanism for the accomplishment of this purpose is illustrated in Figs. 12 and 13. In our co-pending application, entitled "Type slug side trimmer," Serial No. 417,346, filed October 31, 1941, there is described a machine for trimming the sides of a slug in which an approaching slug strikes a trip and sets in motion mechanism for forcibly advancing the slug and for guiding it in a proper path relative to the side trimming cutter.

The present invention may be used in conjunction with the side trimmer disclosed in said application and driven by the same source of power. In such a case the shaft 117 supports a cam 130 on the opposite side of the gear 116, from that at which the cam 118 is disposed (see Fig. 12). This cam is clutched to the gear 116 for rotation therewith through a single cycle upon the approach of each slug, through mechanism fully described in the co-pending application above identified. When the two machines are used in conjunction, the end trimmer of the present invention follows the operation of the side trimmer after a short time interval. The cam 130 is therefore provided with a portion 131 of generally circular contour and having a raised portion 132 projecting from its periphery. At the proper time in the cycle of the cam 130 this rise 132 engages the end of a lever 133 which is mounted on a hub 134 on a shaft 135. The hub 134 also carries a clutch release finger 136 adapted to be withdrawn from its normal position within the slot of a spring pressed clutch pin 137. This clutch pin is normally held out of recesses formed on the side of the worm gear 116 by engagement of the finger 136 within its slot, so that it assumes the position illustrated in Fig. 12. When the finger 136 is withdrawn from the slot in the clutch pin, the pin is urged by its spring into clutching engagement with the gear 137, so that rotation of the gear imparts rotation to the cam 118. Due to the tapered shape of the end of the clutch finger 136, it will, upon being returned to its normal position, re-enter the slot in the clutch pin, withdrawing the same to cause the cam to come to rest at the end of a single cycle.

In operation of the device as described, upon each rotation of the cam 130 the rise 132 engages the lever 133 to swing it, and, through the hub 134, to swing the clutch release finger 136 to its released position. After the clutch engages, the lever 133 and clutch release finger 136 are returned to their normal position by a spring or other means not shown, so that the cam 135 rotates through one cycle and effects a complete cycle of operation of the slug gripping jaws, as hereinbefore described, suitably timed with the descent of the slug that has issued from the line casting machine.

Having thus described our invention, what we claim and desire to secure by Letters Patent is:

1. In a type slug trimming machine, means to feed type slugs to cutters comprising a gripper jaw, means to reciprocate said jaw toward and away from the cutters, a second gripper jaw cooperating with the first jaw, resilient means opposing reciprocation of the second jaw, and means connecting the jaws to cause them to grip a slug upon movement in one direction and to release the slug and then repel it from the cutters upon movement in the opposite direction.

2. In a type slug trimming machine means to feed type slugs to cutters comprising a gripper jaw, means to reciprocate said jaw, a second jaw normally spaced from the first jaw, spring means resisting reciprocation of the second jaw in two directions whereby movement of the first jaw in one direction will cause it to close upon a slug positioned between the jaws and then move the second jaw, and means whereby movement of the first jaw in the opposite direction will effect movement of the second jaw, elevation of the first jaw to release the slug and discharge of the slug away from the cutter.

3. In a type slug trimming machine, a pair of jaws adapted to feed slugs to cutter members comprising means to reciprocate one jaw from a normal position toward the cutters, then back through its normal position and away from the cutters, means resiliently holding the other jaw in a normal position spaced from the first jaw, and a connection between the jaws causing them to cooperate in clamping a slug in one direction of their movement and to release the slug in the opposite direction.

4. In a type slug trimming machine a pair of gripper jaws to receive and feed slugs to cutter members and to feed the slugs away from the cutter members after they have been trimmed, means for positively driving one of said jaws, resilient means for returning the other jaw from its position away from the cutter member to its normal position, and a connection between the jaws to insure such return upon failure of said resilient means.

5. In a type slug cutter having a pair of cutting members, grippers positioned to receive a slug adjacent the cutting members, means for reciprocating said grippers horizontally, a roller carried by one gripper and adapted to travel in a cam slot whereby reciprocation of the gripper will effect raising and lowering of said one gripper.

6. In a type slug cutter having cutting members, grippers positioned to receive a slug adjacent the cutting members and slidable to and away from the cutting members to present the slug to the members and to eject it after it has been cut, means for reciprocating one of said gripper connections between the grippers to cause them to close on the slug during their movement toward the cutter and to release the slug as it is ejected from the cutter and means to raise one gripper relative to the other during ejection to permit the slug to be pushed against a stack of slugs previously cut.

CHARLES W. CURLE.
THEODORE C. CURLE.
RAY F. NEWTON.